United States Patent
Tanemura et al.

(10) Patent No.: US 11,656,712 B2
(45) Date of Patent: May 23, 2023

(54) SIDE-FORCE DETECTION IN AN INPUT DEVICE HAVING A CAPACTIVE SENSOR

(71) Applicant: SYNAPTICS INCORPORATED, San Jose, CA (US)

(72) Inventors: Tetsuo Tanemura, Tokyo (JP); Shunsuke Araki, Yokohama (JP)

(73) Assignee: Synaptics Incorporated, San Jose, CA (US)

( * ) Notice: Subject to any disclaimer, the term of this patent is extended or adjusted under 35 U.S.C. 154(b) by 320 days.

(21) Appl. No.: 16/027,477

(22) Filed: Jul. 5, 2018

(65) Prior Publication Data
US 2019/0012015 A1    Jan. 10, 2019

Related U.S. Application Data

(60) Provisional application No. 62/528,797, filed on Jul. 5, 2017.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04105* (2013.01); *G06F 2203/04107* (2013.01)

(58) Field of Classification Search
USPC ........................................................ 345/174
See application file for complete search history.

(56) References Cited

U.S. PATENT DOCUMENTS

| | | | |
|---|---|---|---|
| 2016/0026316 A1* | 1/2016 | Choi | G06F 1/3231 345/173 |
| 2016/0246413 A1* | 8/2016 | Kano | G06F 1/1626 |
| 2017/0269784 A1* | 9/2017 | Nakajima | G06F 3/0418 |
| 2018/0059866 A1* | 3/2018 | Drake | G06F 3/0416 |
| 2018/0067600 A1* | 3/2018 | Li | G06F 3/0414 |

OTHER PUBLICATIONS

Tetsuo Tanemura, "Grip Based Side Touch Object Extraction", Electronic Publication dated Feb. 23, 2017, consists of 3 pages.

* cited by examiner

*Primary Examiner* — Kenneth Bukowski
(74) *Attorney, Agent, or Firm* — Leydig, Voit & Mayer, Ltd.

(57) ABSTRACT

An example a method of detecting a force applied to a side of an input device including sensor electrodes, the method including: detecting first capacitive responses corresponding to a first plurality of sensor electrodes disposed near the side of the input device; detecting second capacitive responses corresponding to a second plurality of sensor electrodes disposed near a center of the input device; and determining a magnitude of the force applied to the side of the input device based on at least one of: a number of the second capacitive responses satisfying a first threshold; or magnitudes of the second capacitive responses.

20 Claims, 12 Drawing Sheets

SIDE-FORCE DETECTION IN AN INPUT DEVICE HAVING A CAPACTIVE SENSOR

CROSS-REFERENCE TO RELATED APPLICATIONS

This application claims benefit of U.S. provisional patent application Ser. No. 62/528,797, filed Jul. 5, 2017, entitled "SIDE-FORCE DETECTION IN AN INPUT DEVICE HAVING A CAPACITIVE SENSOR", which is herein incorporated by reference in its entirety.

BACKGROUND

Field of the Disclosure

Embodiments of disclosure generally relate to capacitive sensing and, more particularly, to detecting side-force applied to an input device using a capacitive sensor.

Description of the Related Art

Input devices including proximity sensor devices may be used in a variety of electronic systems. A proximity sensor device may include a sensing region, demarked by a surface, in which the proximity sensor device determines the presence, force, location and/or motion of one or more input objects. Proximity sensor devices may be used to provide interfaces for the electronic system. For example, proximity sensor devices may be used as input devices for larger computing systems, such as opaque touchpads integrated in, or peripheral to, notebook or desktop computers. Proximity sensor devices may also often be used in smaller computing systems, such as touch screens integrated in cellular phones.

SUMMARY

In an embodiment, a method of detecting a force applied to a side of an input device including sensor electrodes, the method comprising: detecting first capacitive responses corresponding to a first plurality of sensor electrodes disposed near the side of the input device; detecting second capacitive responses corresponding to a second plurality of sensor electrodes disposed near a center of the input device; and determining a magnitude of the force applied to the side of the input device based on at least one of: a number of the second capacitive responses satisfying a first threshold; or magnitudes of the second capacitive responses.

In another embodiment, a processing system for an input device having a capacitive sensor, the capacitive sensor comprising sensor electrodes, the processing system comprising: a sensor module having sensor circuitry configured to operate the sensor electrodes to receive resulting signals; and a determination module configured to process the resulting signals to: detect first capacitive responses corresponding to a first plurality of sensor electrodes disposed near the side of the input device; detect second capacitive responses corresponding to a second plurality of sensor electrodes disposed near a center of the input device; and determine a magnitude of the force applied to the side of the input device based on at least one of: a number of the second capacitive responses satisfying a first threshold; or magnitudes of the second capacitive responses.

In another embodiment, a method of detecting presence of a grip on sides of an input device, the method comprising: operating sensor electrodes of the input device to receive resulting signals for a plurality of time periods; determining capacitive images from the resulting signals received during plurality of time periods; determining grip metrics for each of a plurality of zones in the sensor electrodes from the capacitive images; comparing the grip metrics across the plurality of zones over the plurality of time periods to determine presence of a grip on the sides of the device; and determining a grip type of the grip.

In another embodiment, a processing system for an input, the processing system comprising: a sensor module having sensor circuitry configured to operate sensor electrodes to receive resulting signals during a plurality of time periods; and a determination module configured to process the resulting signals to: determine capacitive images from the resulting signals for the plurality of time periods; determine grip metrics for each of a plurality of zones in the sensor electrodes from the capacitive images; compare the grip metrics across the plurality of zones over a plurality of time periods to determine presence of a grip on sides of the input device; and determine a grip type of the grip.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-D depict top views of the input device given side-forces applied to the input device according to one or more embodiments.

Figure 1:
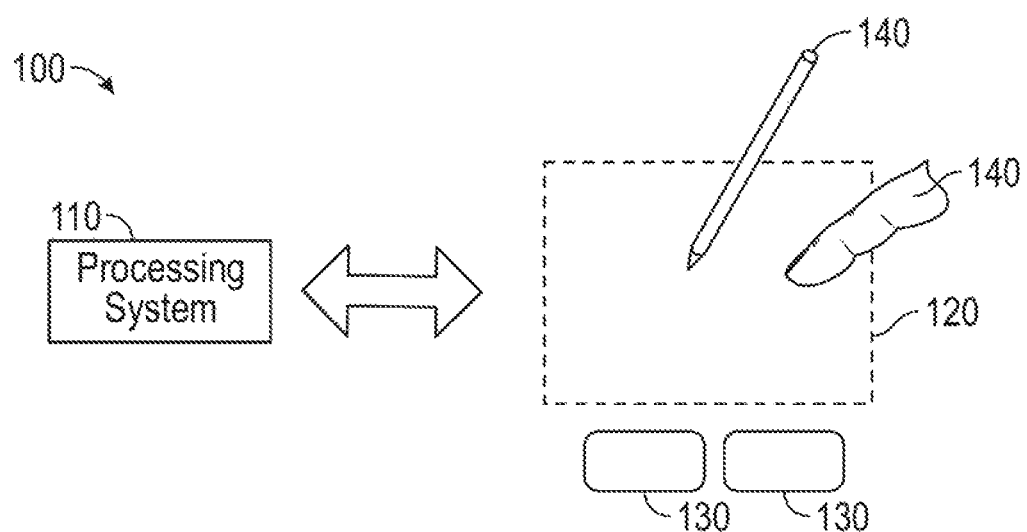
FIG. 1 is a block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects include fingers and styli, as shown in FIG. 1. An exemplary proximity sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises: no contact with any surfaces of the input device 100, contact with an input surface, e.g. a touch surface, of the input device 100: contact with an input surface of the input device 100 coupled with some amount of applied force or pressure, and/or a combination thereof. In various embodiments, input surfaces may be provided by surfaces of casings within which the sensor electrodes (also referred to as sensing electrodes) reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g. system ground, and by detecting the capacitive coupling between the sensor electrodes and input objects.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to as "transmitter electrodes") and one or more receiver sensor electrodes (also referred to as "receiver electrodes"). Transmitter sensor electrodes may be modulated relative to a reference voltage, e.g., system ground, to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference, e.g. other electromagnetic signals. Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g. to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen or an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110. The display screen may also be referred to as a display panel.

It should be understood that while many embodiments of the invention are described in the context of a fully functioning apparatus, the mechanisms of the present invention are capable of being distributed as a program product, e.g., software, in a variety of forms. For example, the mechanisms of the present invention may be implemented and distributed as a software program on information bearing media that are readable by electronic processors, e.g., non-transitory computer-readable and/or recordable/writable information bearing media readable by the processing system 110. Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
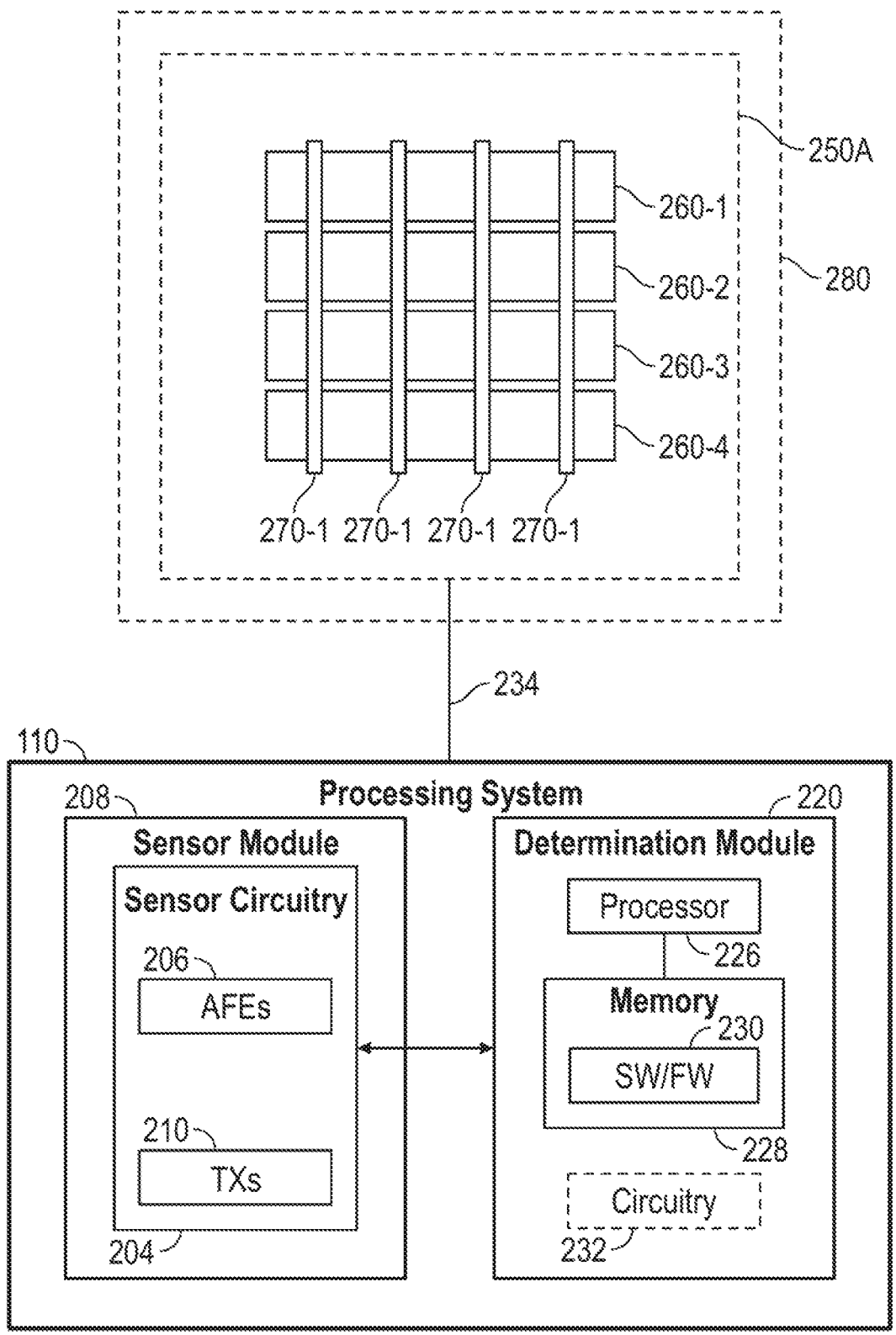
FIGS. 2A-2B illustrate portions of patterns of sensing elements according to one or more embodiments.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. An electrode pattern 250A may comprise a first plurality of sensor electrodes 260 (260-1, 260-2, 260-3, . . . 260-n), and a second plurality of sensor electrodes 270 (270-1, 270-2, 270-3, . . . 270-m). The second plurality of sensor electrodes may be disposed over the first plurality of sensor electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250A can be coupled to the processing system 110 through routing traces 234.

The first plurality of sensor electrodes 260 and the second plurality of sensor electrodes 270 are typically ohmically isolated from each other. That is, one or more insulators separate the first plurality of sensor electrodes 260 and the second plurality of sensor electrodes 270 and prevent them from electrically shorting to each other. In some embodiments, the first plurality of sensor electrodes 260 and the second plurality of sensor electrodes 270 are separated by insulative material disposed between them at cross-over areas; in such constructions, the first plurality of sensor electrodes 260 and/or the second plurality of sensor electrodes 270 can be formed with jumpers connecting different portions of the same electrode. In some embodiments, the first plurality of sensor electrodes 260 and the second plurality of sensor electrodes 270 are separated by one or more layers of insulative material. In such embodiments, the first plurality of sensor electrodes 260 and the second plurality of sensor electrodes 270 can be disposed on separate layers of a common substrate. In some other embodiments, the first plurality of sensor electrodes 260 and the second plurality of sensor electrodes 270 are separated by one or more substrates; for example, the first plurality of sensor electrodes 260 and the second plurality of sensor electrodes 270 can be disposed on opposite sides of the same substrate, or on different substrates that are laminated together. In some embodiments, the first plurality of sensor electrodes 260 and the second plurality of sensor electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

In an embodiment, the processing system 110 includes a sensor module 208 and a determination module 220. The sensor module 208 may include sensor circuitry 204 that operates the electrode pattern 250A to receive resulting signals from sensor electrodes using capacitive sensing signals. The determination module 220 may be coupled to the sensor module 208 and/or the sensor circuitry 204. The determination module 220 may be configured to determine capacitive measurements from the resulting signals received from the sensor module 208 or the sensor circuitry 204. The determination module 220 can also determine position information from the capacitive measurements. In an embodiment, the determination module 220 includes processor circuitry 226, such as a digital signal processor (DSP), microprocessor, or the like. The determination module 220 can include memory 228 configured to store software and/or firmware (SW/FW 230) configured for execution by processor circuitry 226 to implement various functions, such as filtering the resulting signals, processing the resulting signals to determine capacitive measurements, determining object position from the capacitive measurements, etc. Alternatively, some or all of the functions of the determination module 220 can be implemented entirely in hardware, e.g., using circuitry 232. In various embodiments, the processing system 110 can include other modular configurations, and the functions performed by the sensor module 208 and the determination module 220 can be performed by one or more modules or circuits in the processing system 110.

In an embodiment, the processing system 110 comprises a single integrated controller, such as an application specific integrated circuit (ASIC), having the sensor module 208, the determination module 220, and any other module(s) and/or circuit(s). In another embodiment, the processing system 110 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules, such as a display driver module.

In various embodiments, the processing system 110 performs one or more of force sensing and proximity sensing (also referred to as "touch sensing"). The processing system 110 may perform force sensing in force sensing periods and proximity sensing in proximity sensing periods. The force sensing periods and the proximity sensing periods can be interleaved with other periods, such as display update periods. In an embodiment, the processing system 110 performs force sensing in sequence with proximity sensing. For example, the force sensing is performed during period(s) of force sensing following period(s) of proximity sensing. In another embodiment, the processing system 110 performs force sensing concurrently with proximity sensing. For example, the force sensing period and the proximity sensing period are a single sensing period. The processing system 110 can perform either or both of transcapacitive proximity sensing or absolute capacitive proximity sensing. In various embodiments, the processing system 110 performs transcapacitive and/or absolute capacitive force sensing.

The sensor circuitry 204 may include analog front ends (AFEs) 206 and transmitters (TXs) 210. Each AFE 206 may be configured to measure voltage, current, or charge on a sensor electrode and generate a resulting signal. Each AFE 206 can include various circuits, including any combination of an integrating amplifier or current conveyer, a sampler, a demodulator, one or more filters, an analog-to-digital converter (ADC), and the like. Each transmitter 210 may be configured to drive a sensor electrode with a transmitter signal. A transmitter signal can be a time-varying signal, e.g., a sinusoidal signal, square wave signal, triangle wave signal, etc., or a constant signal. For example, a transmitter signal can be a time-varying voltage with respect to a reference voltage, e.g., system ground, or a constant voltage with respect to the reference voltage. A time-varying transmitter signal can have fixed amplitude, frequency, and phase. Alternatively, at least one of the amplitude, frequency, and phase of a time-varying transmitter signal can be modulated. Each transmitter 210 can include a signal generator circuit configured to generate a transmitter signal having the selected characteristics.

In transcapacitive sensing, a sensor electrode that is driven with a transmitter signal is a "transmitter electrode" and a sensor electrode from which a resulting signal is received is a "receiver electrode." In an embodiment, some electrodes in the electrode pattern 250 are only capable being receiver electrodes, while other electrodes are only capable of being transmitter electrodes. Alternatively, some electrodes in the electrode pattern 250 are capable of being receiver electrodes in one mode and transmitters electrode in another mode. In some embodiments, the AFEs 206 are coupled to the receiver electrodes and the transmitters 210 are coupled to the transmitter electrodes. The sensor circuitry 204 can include at least one AFE 206 for each of the receiver electrodes in the electrode pattern 250. Alternatively, the sensor circuitry 204 can include less AFEs 206 than receiver electrodes and the processing system 110 can include multiplexing logic to selectively couple AFE(s) 206 to each receiver electrode during operation. Likewise, the sensor circuitry 204 can include at least one transmitter 210 for each of the transmitter electrodes in the electrode pattern 250. Alternatively, the sensor circuitry 204 can include fewer transmitters 210 than transmitter electrodes and the processing system 110 can include multiplexing logic to selectively couple transmitter(s) 210 to each transmitter electrode during operation. In absolute capacitive sensing, the AFEs 206 generate resulting signals using sensor electrodes of the electrode pattern 250 as there is no notion of "transmitter sensor electrodes" or "receiver sensor electrodes."

In absolute capacitive sensing, AFEs 206 in the sensor circuitry 204 measure voltage, current, or charge on sensor electrodes with respect to reference signals to generate resulting signals. Each reference signal can be time-varying or constant, e.g., a time-varying voltage signal or a constant voltage signal. For each proximity sensing period, the determination module 220 may generate absolute capacitive values from the resulting signals. The determination module 220 can determine a plurality of absolute capacitance measurements over a plurality of proximity sensing periods to detect input object(s) in the sensing region 120.

In transcapacitive sensing, transmitters 210 in the sensor circuitry 204 drive touch transmitter electrodes with transmitter signals. AFEs 206 in the sensor circuitry 204 measure voltage, current, or charge on the touch receiver electrodes to generate the resulting signals. The resulting signals comprise the effects of the transmitter signals and input object(s) in the sensing region 120. For each proximity sensing period, the determination module 220 may generate transcapacitive values from the resulting signals. The determination module 220 can determine a plurality of transcapacitive measurements over a plurality of proximity sensing periods to detect input object(s) in the sensing region 120.

In some embodiments, the processing system 110 "scans" the electrode patterns 250A and 250B to determine capacitive measurements. In the transcapacitive sensing mode, the processing system 110 can drive the first plurality of sensor electrodes 260 to transmit transmitter signal(s). In one embodiment, the processing system 110 can operate the first plurality of sensor electrodes, e.g., sensor electrode 260 or one or more sensor electrodes of sensor electrodes 240, such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of sensor electrodes, e.g., sensor electrodes 270 or one or more of sensor electrodes 240, to be independently determined. In the absolute capacitive sensing mode, the processing system 110 can receiving resulting signals from one sensor electrode 260, 270, 240 at a time, or from a plurality of sensor electrodes 260, 270, 240 at a time. In either mode, the processing system 110 can operate the sensor electrodes singly or collectively to acquire resulting signals. In absolute capacitive sensing mode, the processing system 110 can concurrently drive all electrodes along one or more axes. In some examples, the processing system 110 can drive sensor electrodes along one axis (e.g., along the first plurality of sensor electrodes 260) while sensor electrodes along another axis are driven with a shield signal, guard signal, or the like. In some examples, some sensor electrodes along one axis and some electrodes along the other axis can be driven concurrently. In one embodiment, the sensor electrodes are scanned during capacitive frames. For example, a capacitive frame corresponds to a time period during which each transcapacitive measurement or absolute capacitive measurement of electrode patterns 250A and 250B may be determined.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The determination module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen. In various embodiments, the display electrodes comprise one or more segments of a "Vcom" electrode, that is a common electrode), gate lines, source lines, anode electrodes, cathode electrodes, and/or other display elements. In various embodiments, gate lines may also be referred to as gate electrodes and/or the source lines may also be referred to as source electrodes. These display electrodes may be disposed on an appropriate display screen substrate. For example, the display electrodes may be disposed: on a transparent substrate, e.g., a glass substrate, TFT glass, or any other transparent material, in some display screens, such as In Plane Switching (IPS) and Plane to Line Switching (PLS) Organic Light Emitting Diode (OLED); on the bottom of a color filter glass of some display screens, such as Patterned Vertical Alignment (PVA) and Multi-domain Vertical Alignment (MVA); and over an emissive layer of OLED. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality of sensor electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

Figure 2B:
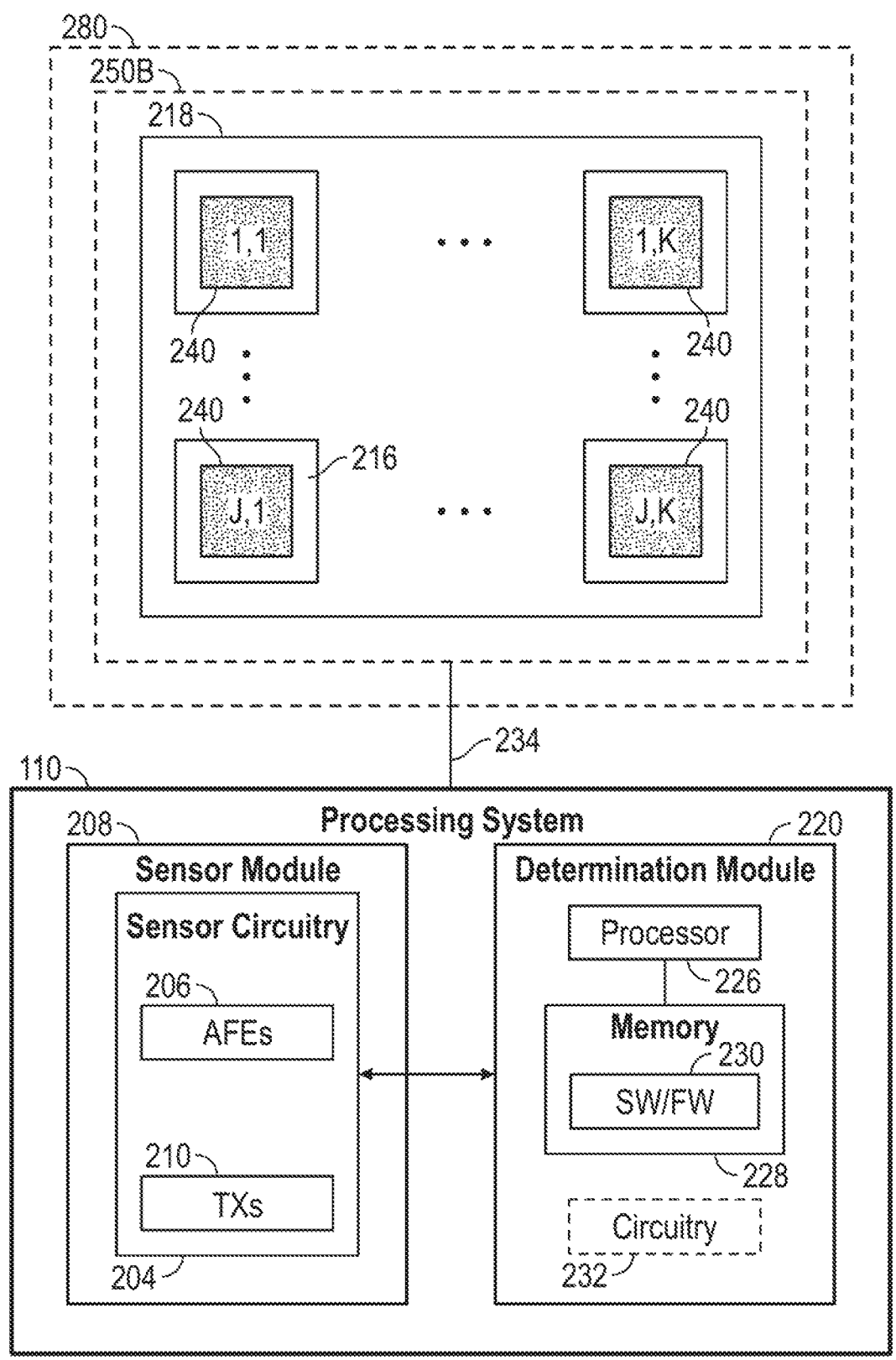

FIG. 2B illustrates a portion of another exemplary pattern of sensing elements according to some embodiments. For clarity of illustration and description, FIG. 2B presents the sensing elements while not showing various other components, such as various interconnects between the processing system 110 and the sensing elements. An electrode pattern 250B comprises a plurality of sensor electrodes 240 disposed in a rectangular matrix. The electrode pattern 250B comprises sensor electrodes $240_{J,K}$ (referred to collectively as sensor electrodes 240) arranged in J rows and K columns, where J and K are positive integers, although one of J and K may be zero. It is contemplated that the electrode pattern 250B may comprise other patterns of the sensor electrodes 240, such as polar arrays, repeating patterns, non-repeating patterns, non-uniform arrays a single row or column, or other suitable arrangement. Further, the sensor electrodes 240 may be any shape, such as circular, rectangular, diamond, star, square, noncovex, convex, nonconcave concave, etc. Further, the sensor electrodes 240 may be sub-divided into a plurality of distinct sub-electrodes.

In various embodiments, the sensor electrodes 240 are ohmically isolated from one another. In other embodiments where a sensor electrode 210 includes multiple sub-electrodes, the sub-electrodes may be ohmically isolated from each other. In still further embodiments, the sensor electrodes 240 may be ohmically isolated from a grid electrode 218. The grid electrode 218 may be disposed between the sensor electrodes 240. In some embodiments, the grid electrode 218 may surround one or more of the sensor electrodes 240, which are disposed in windows 216 of the grid electrode 218. In some embodiments, the electrode pattern 250B can include more than one grid electrode 218. In some embodiments, the grid electrode 218 can have one or more segments. The grid electrode 218 may be used as a shield or to carry a guarding signal for use when performing capacitive sensing with the sensor electrodes 240. Alternatively or additionally, the grid electrode 218 may be used as sensor electrode when performing capacitive sensing. Furthermore, the grid electrode 218 may be co-planar with the sensor electrodes 240, but this is not a requirement. For instance, the grid electrode 218 may be located on a different substrate or on a different side of the same substrate as the sensor electrodes 240. The grid electrode 218 is optional and in some embodiments, the grid electrode 218 is not present.

In some embodiments, the electrode pattern 250A or the sensor electrode pattern 250B are coupled to the processing system 110. In a first mode of operation, the processing system 110 can use at least one sensor electrode 210 to detect the presence of an input object via absolute capacitive sensing. The sensor module 208 can measure voltage, charge, or current on sensor electrode(s) 210 to obtain resulting signals indicative of a capacitance between the sensor electrode(s) 210 and an input object. The determination module 220 can use the resulting signals to determine absolute capacitive measurements. For the electrode pattern 250B, the absolute capacitive measurements can be used to form capacitive images.

In a second mode of operation, the processing system 110 can use groups of the sensor electrodes 240 to detect the presence of an input object via transcapacitive sensing. The sensor module 208 can drive at least one of the sensor electrodes 240 with a transmitter signal, and can receive a resulting signal from at least one other of the sensor electrodes 240. The determination module 220 can use the resulting signals to determine transcapacitive measurements and form capacitive images.

The input device 100 may be configured to operate in any one of the modes described above. The input device 100 may also be configured to switch between any two or more of the modes described above. The processing system 110 can be configured as described above with respect to FIG. 2A.

Figure 3:
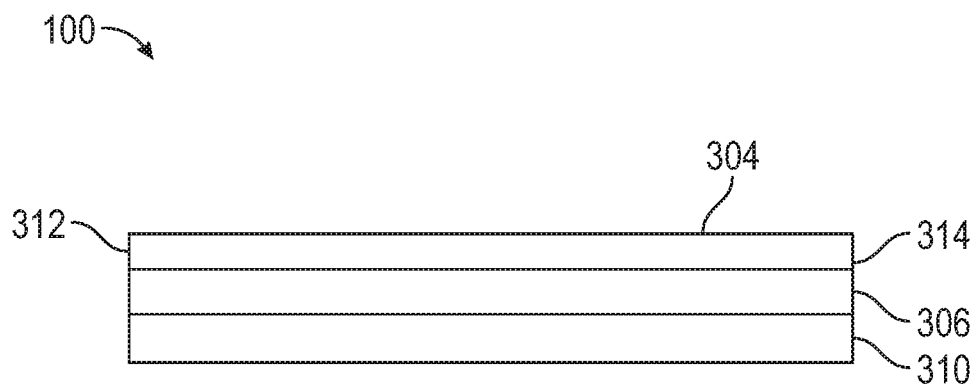
FIG. 3 is a block diagram depicting a cross-section of an input device according to one or more embodiments.

FIG. 3 is a block diagram depicting a cross-section of an input device 100 according to an embodiment. In this embodiment, the input device 100 includes a plurality of layers which include sensor electrode layer 304 and conductive layer 310. In one or more embodiments, input device may additionally include display panel 306. The display panel 306 may be any type of display, e.g., an OLED display, LED display, or the like, and include one or more of a lens, one or more polarizers, one or more display electrode layers, and display cell, e.g., liquid crystal material, OLEDs. The sensor electrode layer 304 may be formed as part of the display panel 306 or discrete from the display panel 306. In one embodiment, sensor electrode layer 304 may include sensor electrodes arranged according to sensing element pattern 250A or 250B. In one or more embodiments, conductive layer 310 may include any conductive elements disposed below the sensor electrode layer 304. For example, the conductive layer 310 may be a mid-frame of a display device, backlight of a display device, one or more display electrode layers of the display device, or the like. In other embodiments, the conductive layer may include one or portions of the housing of the input device 100 or the battery of the input device 100. In some embodiments, the conductive layer 310 may include one or more sensor electrodes. In such embodiments, the capacitive coupling between the sensor electrodes of the conductive layer varies based on the distance between the two. Further, the sensor electrodes of the conductive layer may be operated in one or more of an absolute capacitive sensing mode or a transcapacitive sensing mode. The conductive layer 310 may be driven with a constant voltage, e.g., a reference voltage, a varying voltage or electrically floated.

Figure 4:
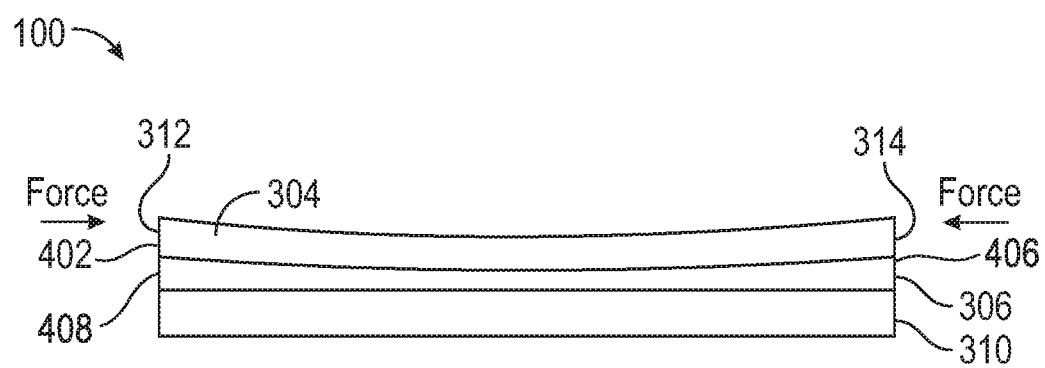
FIG. 4 is a schematic cross-section depicting a force applied to an input device by an input object according to one or more embodiments.

FIG. 4 is a schematic cross-section depicting a force applied to the input device 100 by an input object, according to one or more embodiments. When a force is applied to one or more of sides or edges of the input device 100 by, for example, user's hand and/or fingers, the applied force (also referred to as "side-force") may cause mechanical deformation of the device. This deformation may cause the capacitive couplings of the sensor electrodes of sensor electrode layer 304 to change.

In one embodiment, the sensor electrode layer 304 may be disposed on a substrate layer 402. The substrate layer 402 may include one or more substrates be disposed discrete from or may include one or more substrates of display device 306. The side-force may cause deformation such as bending of the substrate layer 402, which further deforms, e.g., deflects, at least a portion of the sensor electrode layer 304 toward or away from conductive layer 310, altering one or more capacitive couplings of sensor electrode layer 304. As some of the sensor electrodes move closer to the conductive layer 310, the measured capacitance of the deformed sensor electrodes changes. When the force is removed from the device, the sensor electrodes return to their original position with respect to the conductive layer 310.

In one embodiment, as one or more sensor electrodes of sensor electrode layer 304 deforms and moves closer to conductive layer 310, the absolute capacitance of the corresponding sensor electrode or electrodes changes. In other embodiments, the conductive layer 310 may be modulated relative to one or sensor electrodes of sensor electrode layer 304, and as one or more sensor electrodes of sensor electrode layer 304 deforms and moves closer to conductive layer 310, the transcapacitance of the corresponding sensor electrode or electrodes changes relative to the conductive layer 310.

In an embodiment, the processing system 110 detects a side-force, e.g., compression of the input device caused by the user's act of gripping the input device, by analyzing the capacitive response of the sensor electrodes, e.g., sensor electrode of sensor electrode layer 304, in the inner portion of 2D touch active area, while outermost sensor electrodes indicate a response of the grip footprint itself. The inner portion of the capacitive response includes numerous capacitive responses of either relative small positives or relative small negatives induced due to mechanical deformation of the input device, e.g., input device 100. . For example, as sensor electrodes of sensor electrode layer 304 deform relative to each other and relative to conductive layer 310, the capacitive coupling for those sensor electrode changes, changing a capacitive response of those sensor electrodes. In one embodiment, the capacitive response corresponds to the change in capacitive coupling of each sensor electrode to one or more other sensor electrodes and/or conductive layer 310. The processing system 110 can count the number relative small positive/negative capacitive responses, which is indicative of the strength or force of the user's grip on the input device.

As shown schematically in FIG. 4, the application of a compressive force along the sides, e.g., side 406 and side 408, of the input device causes the substrate 402 having the sensor electrodes 304 to deform mechanically. This changes the relative position of the sensor electrodes 204 and the conductive layer 310.

Figure 5A:
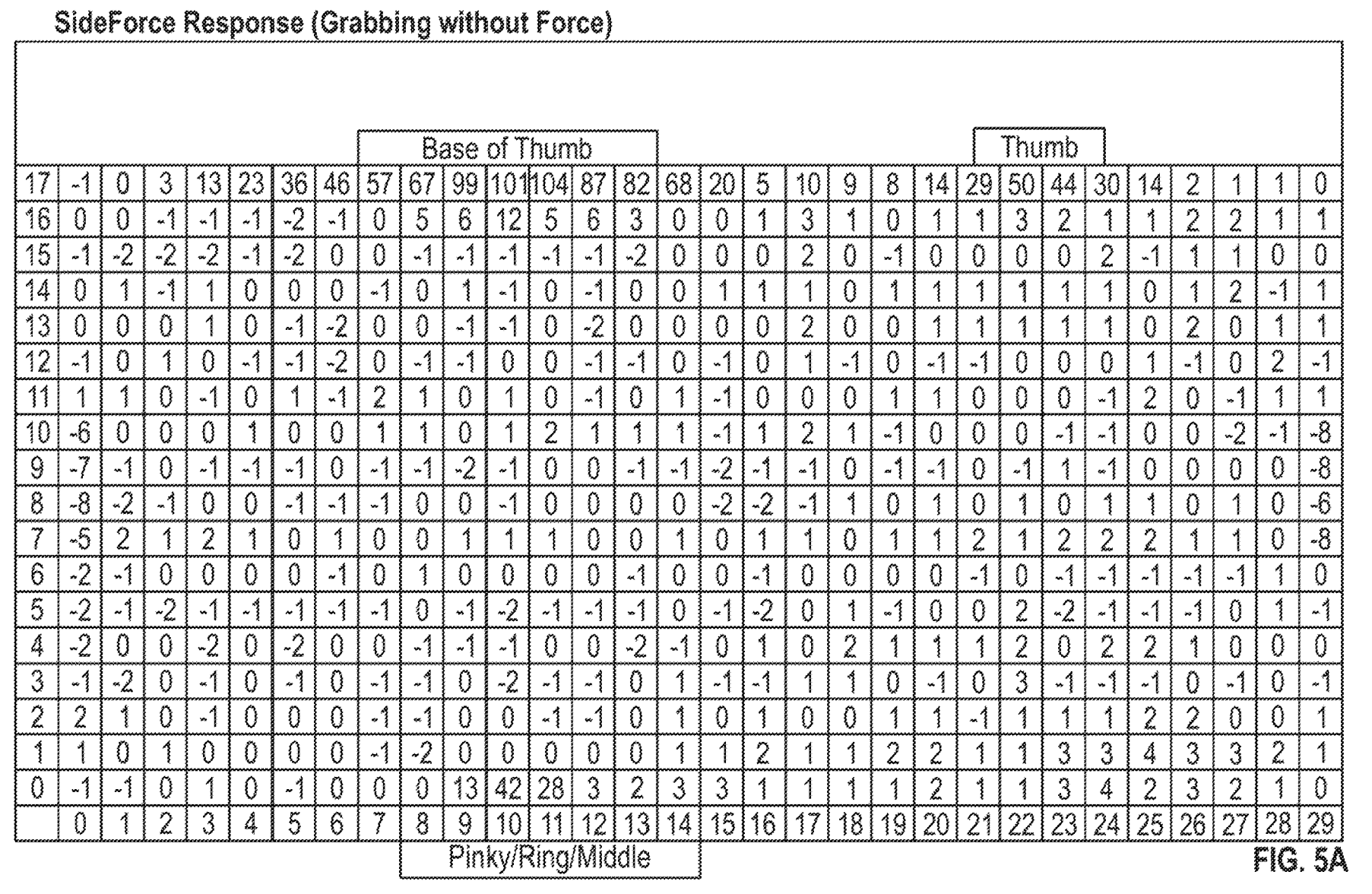
Figure 5B:
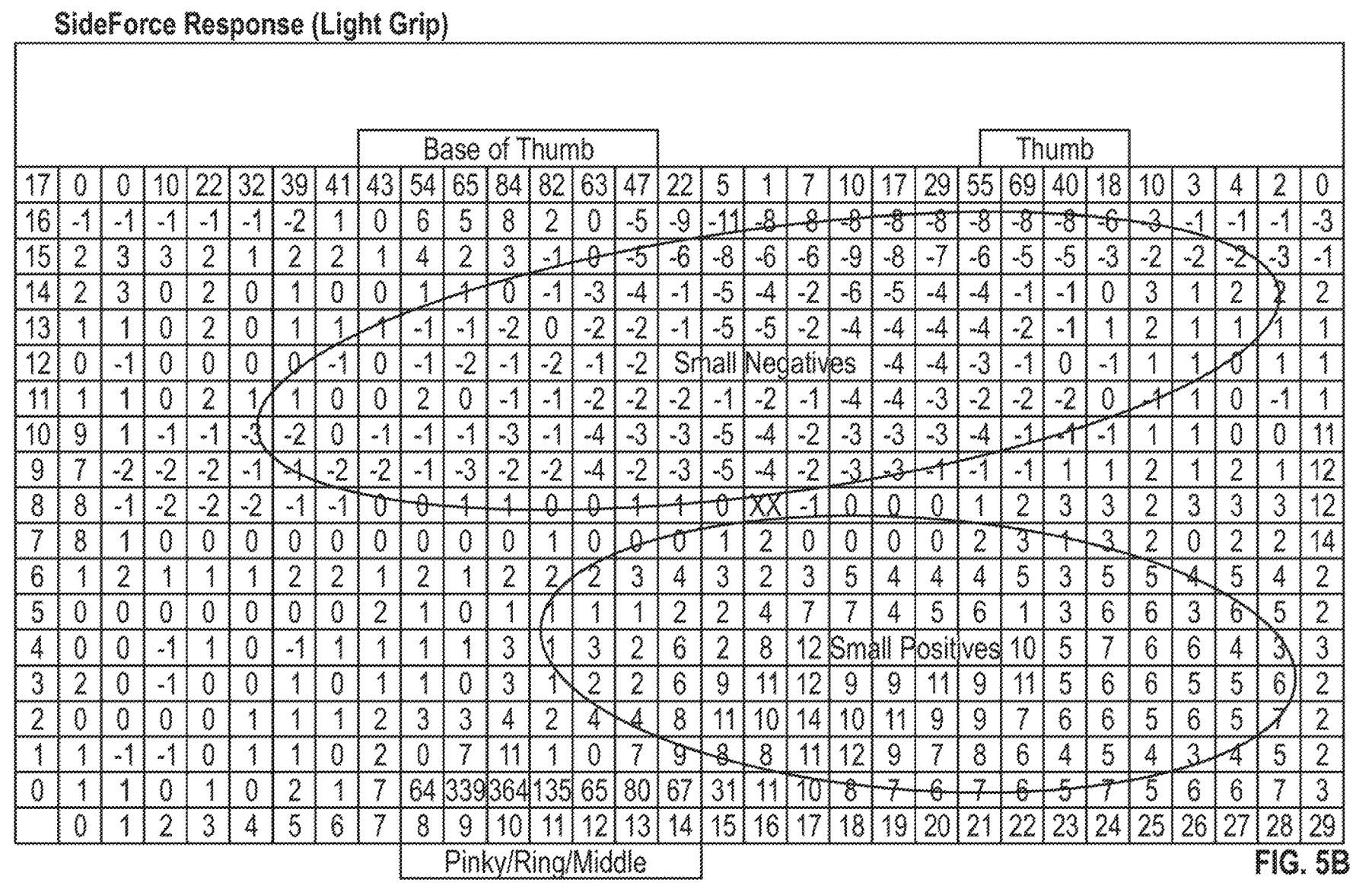
Figure 5C:
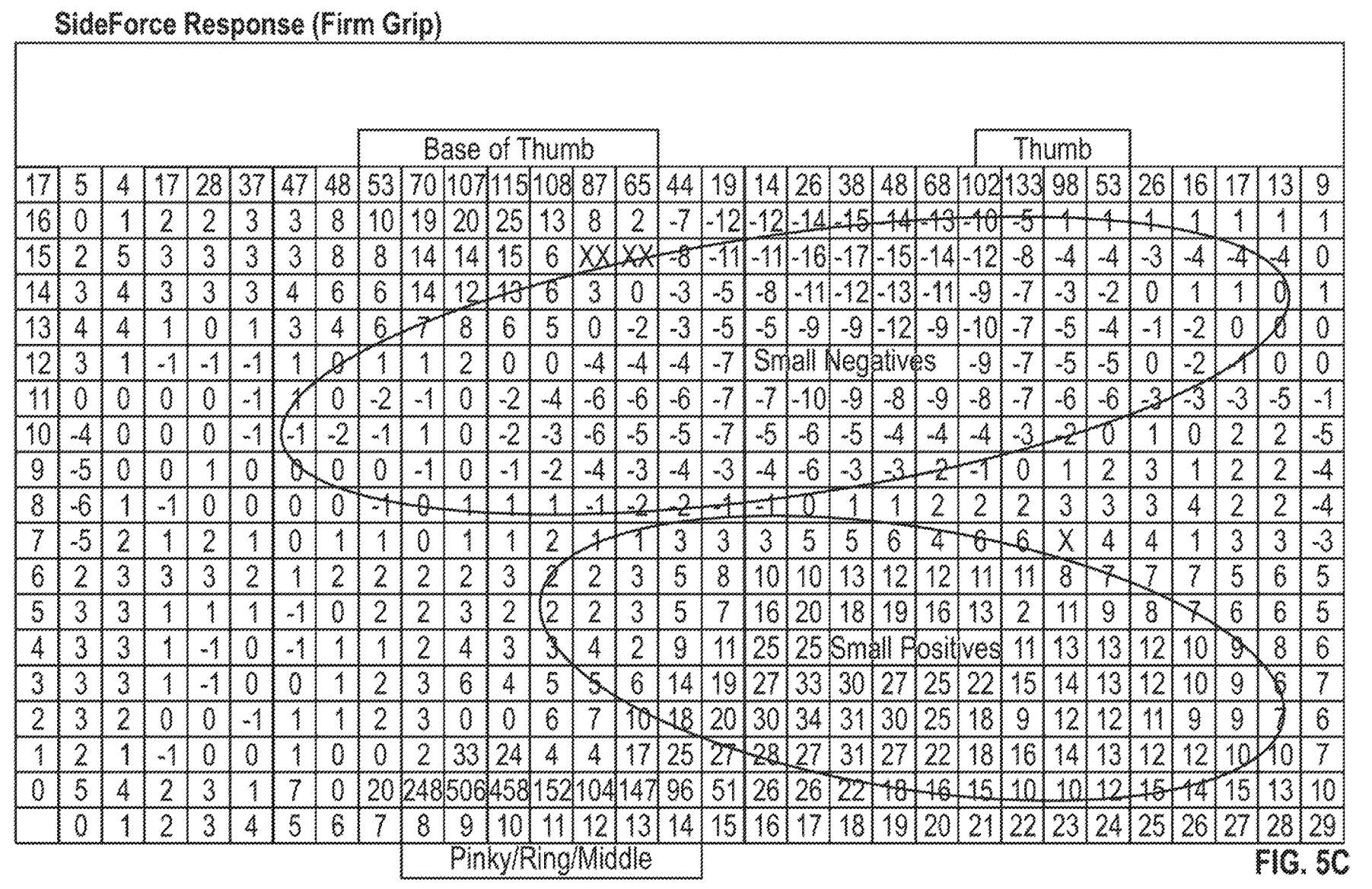
Figure 5D:
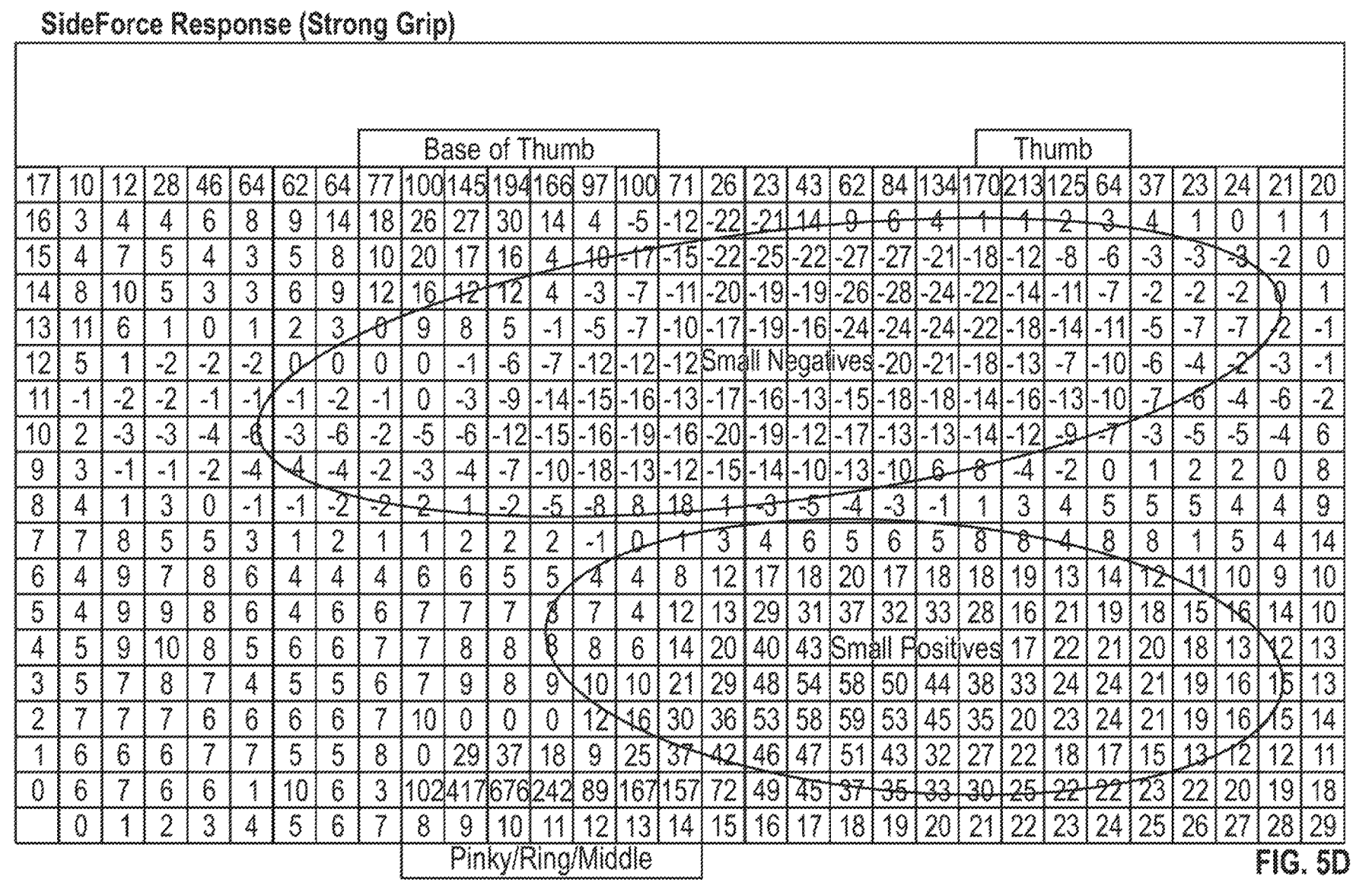

By way of example, FIGS. 5A-5D show example 2D capacitive responses for various strengths of grip force applied to an input device according to embodiments. In each of FIGS. 5A-5D, the capacitive response associated with the outermost sensor electrodes indicates a grip footprint mostly as a result of direct capacitive coupling of the user's fingers (e.g., touch sensing). The capacitive response of these outer sensor electrodes is relatively high. In contrast, the capacitive response associated with some inner sensor electrodes includes a gradation of relative small positive/negative values (with respect to the outer electrodes) due to the mechanical deformation of the sensor electrodes, sensor electrodes of sensor electrode layer 304, with respect to conductive layer 310. The processing system 110 can analyze a histogram of electrode responses having these relative small positives/negatives to estimate the strength of the user's grip on the input device. In general, the more sensor electrodes having small positives/negatives, and the larger the magnitudes of these responses are, the greater the strength of the user's grip on the input device. FIG. 5A shows the capacitive response for a user holding the input device 100 without asserting appreciable grip force. FIG. 5B shows the capacitive response for a user holding the input device with a light grip. FIG. 5C shows the capacitive response for a user holding the input device 100 with a firm grip, e.g., more force applied than light grip. FIG. 5D shows the capacitive response for a user holding the input device 100 with a strong grip, e.g., more force applied than a firm grip. The capacitive responses differ in terms of the number of the inner sensor electrodes that have small positive/negative responses and in terms of the magnitude of these relative small positive/negative responses.

Figure 6:
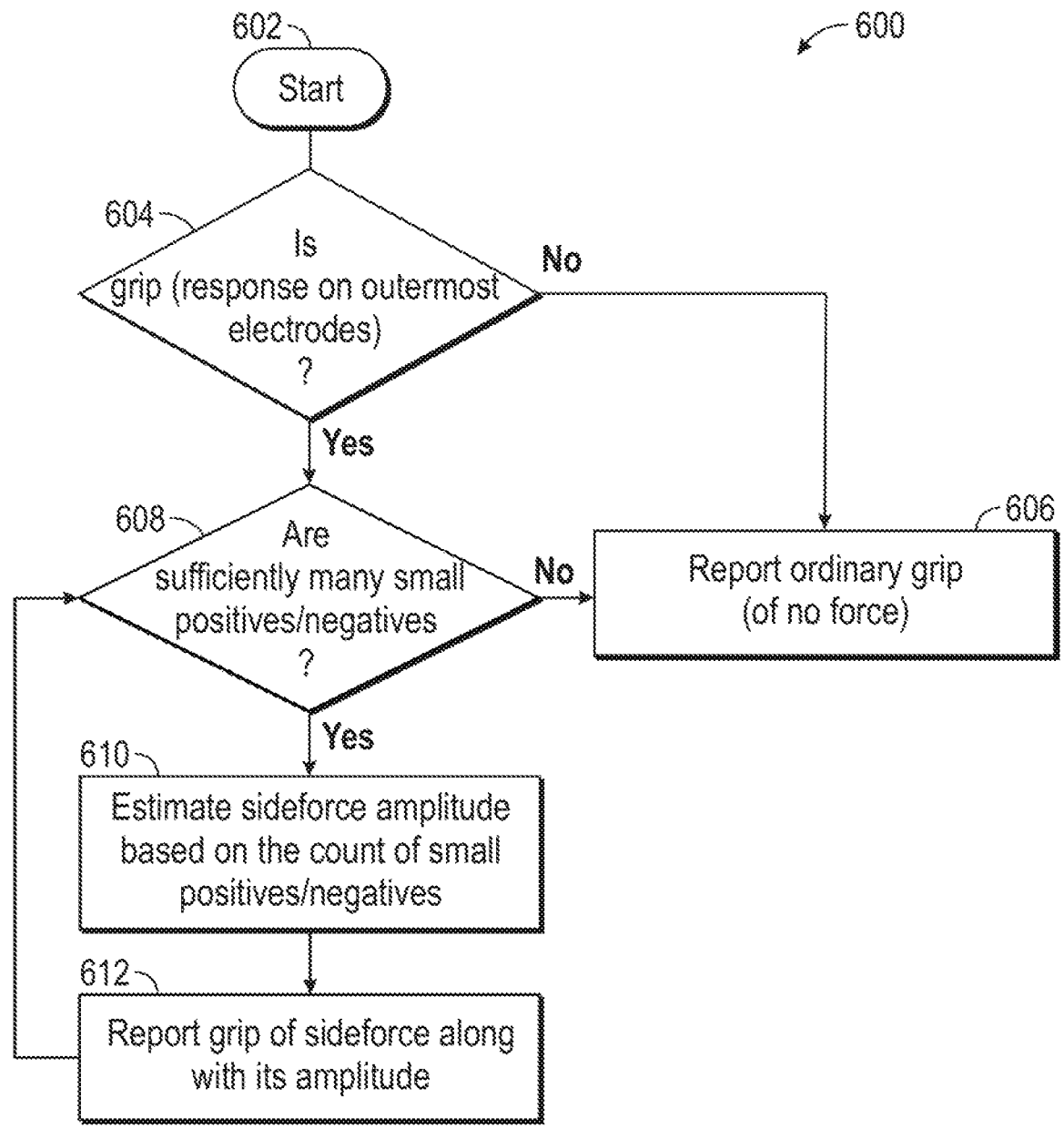
FIG. 6 is a flow diagram depicting a method of operating an integrated display device and capacitive sensing device according to one or more embodiments.

FIG. 6 is a flow diagram depicting a method of sensing side-force ,e.g., grip force, on an input device according to an embodiment. The method 600 begins at step 602. At step 604, the processing system 110 determines if the capacitive response indicates that a user is gripping the input device 100. As shown in FIGS. 5A-5D, a side-force is indicated by analyzing the capacitive response of the outer electrodes in the 2D arrangement of electrodes of the input device. If a grip is not detected, the method 600 continues checking for indication of a grip. If a grip is detected, the method 600 proceeds to step 608. Embodiments of detecting a user's grip on the input device that can be employed in step 604 are described below.

In one or more embodiments, an indication of no side-force includes the scenario where a user's ordinary grip on the device does not apply appreciable force, i.e., the user is holding the device without applying a side-force that has exceeded a threshold. The threshold may be a threshold force level indicative of side-force. If a grip is detected, the method 600 proceeds to step 608.

At step 608, the processing system 110 determines the number and/or magnitude of small positive/negative responses associated with inner sensor electrodes. The processing system 110 can compare the number of such small negative/positive responses to a first threshold. In addition or as an alternative, the processing system 110 can compare the magnitude of such small negative/positive responses to a second threshold. The first and second thresholds may be determined through modeling, device tuning, or the like. If the threshold(s) are not satisfied, the method 600 proceeds to step 606, where the processing system 110 reports an ordinary grip (grip detection) without appreciable force (not satisfying a threshold grip force). If the threshold(s) are satisfied, the method 600 proceeds to step 610, where the processing system 110 indicates the presence of both grip and a side-force. The processing system 110 can also output an estimated strength of the side-force, e.g., grip strength, based on the number of small positive/negative responses and/or the magnitudes of the small negative/positive response. At step 612, the processing system 110 can report the side-force along with its amplitude. If at step 608 the threshold(s) are not satisfied, the method 600 proceeds to step 606.

Grip and un-grip detection in step 604 involves complex and variable hand interactions, which can differ from user to user. The act of gripping the device includes a transient or "chattering" duration where responses along the edge sensor electrodes are unstable. Further, the response from each edge, or grip zone, varies with time. In addition, the responses from all zones are subject of constant "deceptive" changes throughout the course of device operation, especially when the movement of a user's thumb along the device side can distort the grip response used to detect side-force (i.e., the user's thumb used for side-touch operation interferes with grip detection).

In an embodiment, these challenges may be overcome by: (1) Classifying grip type by comparing a response from each zone at different time instances with different criteria/thresholds depending on the order in which such responses may arrive and not reverting back in state transition without going through un-grip state first; and (2) Detecting un-grip of the device by lack of a response from all zones for some duration (e.g., less than one second) so as not to affect usability.

Figure 7:
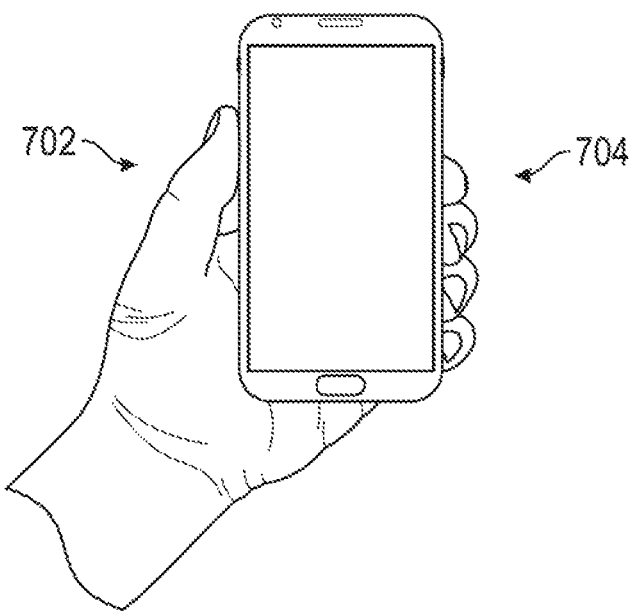
FIG. 7 illustrates such an example where a left zone and a right zone of an input device result in nearly equivalent responses.

Some techniques focus on identifying and characterizing grip/ungrip response instantaneously when the user performs the act of gripping or un-gripping. However, such techniques do not account for the transient conditions discussed above, as well as constant changes, some more drastic than others, caused by the user's thumb movement. Waiting until the responses from all zones stabilize with some different hysteresis for grip and un-grip may be of an option, but this assumes the magnitude of these constant "deceptive" changes remains small, which is not always the case (i.e. there is no stabilized condition during gripping). Also, by the time the responses from all zones reach what may appear to be a stabilized condition, the responses may look indistinguishable from one another, not to mention latency induced. FIG. 7 illustrates such an example where a left zone 702 and a right zone 704 of an input device, e.g., input device 100, result in nearly equivalent responses.

Figure 8:
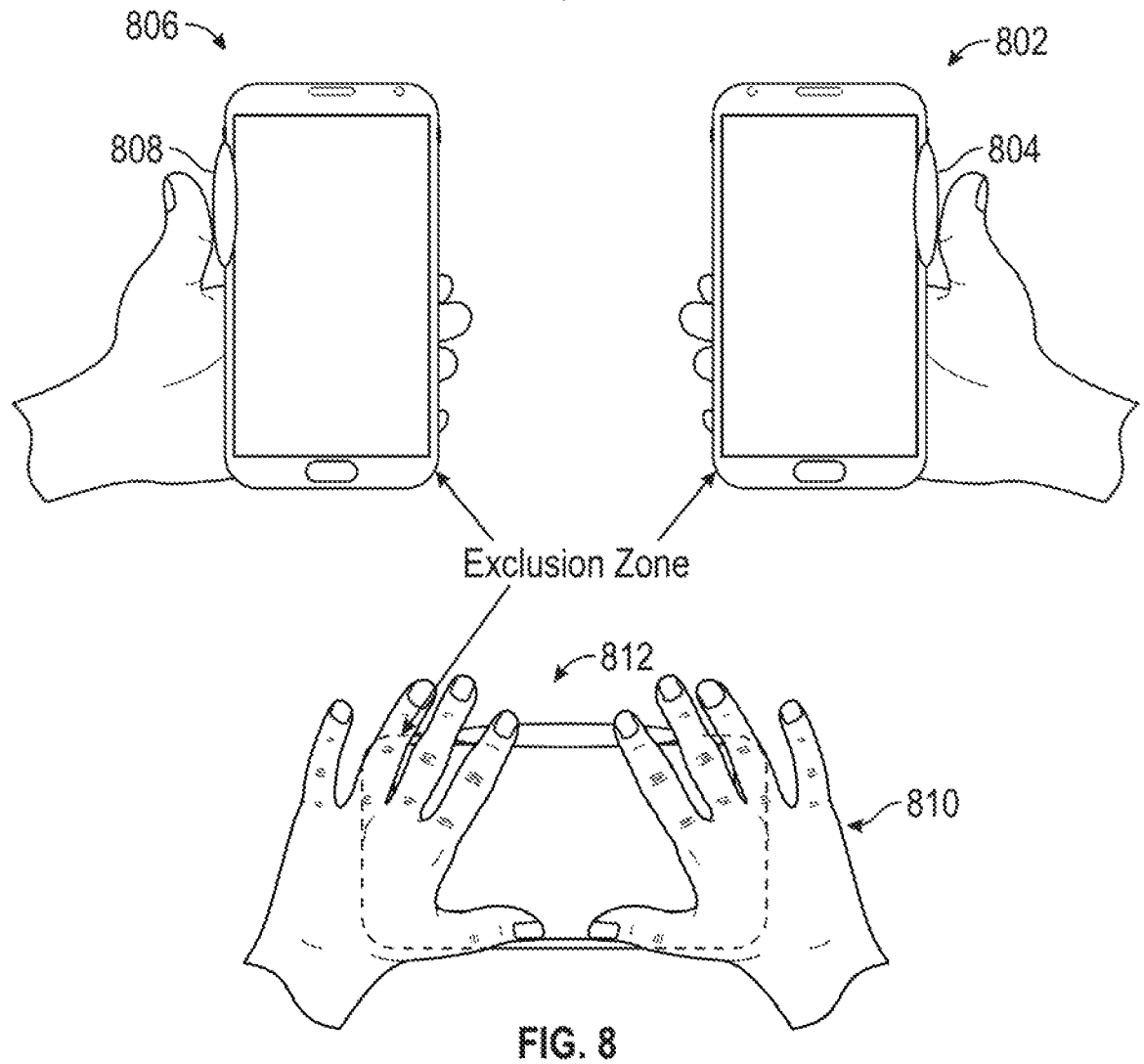
FIG. 8 illustrates different grip types and the corresponding zones of interest in a sensor electrode layer according to an embodiment.

FIG. 8 illustrates different grip types and the corresponding zones of interest in the sensor electrode layer 304. Image 802 shows a right-handed portrait grip and a corresponding zone 804 where a user's thumb is positioned. Image 806 shows a left-handed portrait grip and a corresponding zone 808 where a user's thumb is positioned. Image 810 shows a two-handed landscape grip and a corresponding zone 812 where a user's index fingers are positioned. The processing system 110 can monitor the capacitive responses in different zones over time to detect the presence/absence of a grip and to detect the type of the grip. In one embodiment, the processing system 110 can set an exclusion zone when detecting presence of a grip based on the grip type. Further, the processing system 110 may be configured to ignore objects present in a defined exclusion zone when determining grip type.

Figure 9:
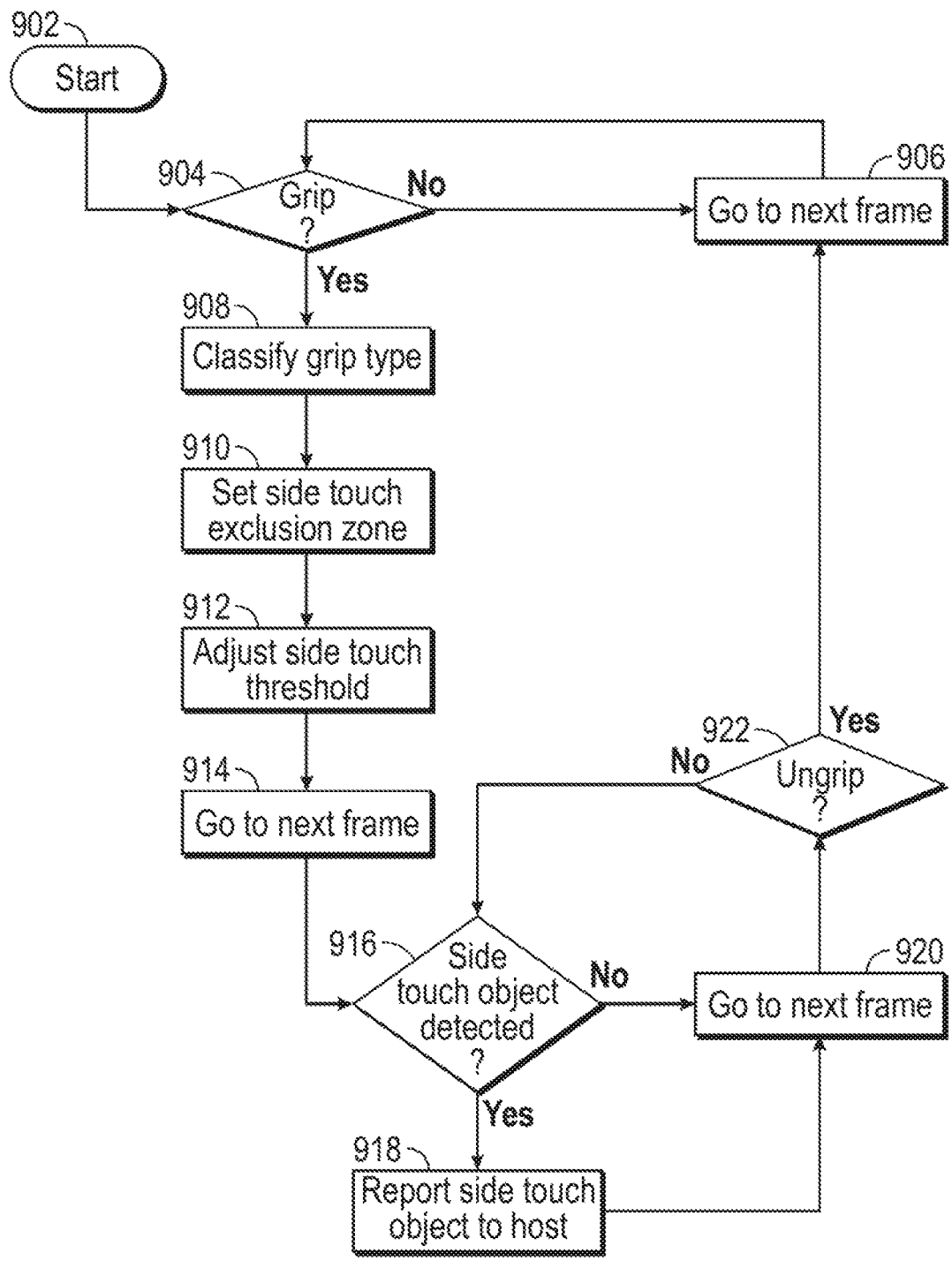
FIG. 9 is a flow diagram depicting a method of detecting presence/absence of a user's grip on a device according to an embodiment.

FIG. 9 is a flow diagram depicting a method of detecting presence/absence of a user's grip on a device, also referred to as side-touch. The method begins at step 902. At step 904, the processing system 110 processes capacitive responses of the sensor electrode of sensor electrode layer 304 acquired during a capacitive frame to determine the presence of a potential grip on the device. If a potential grip is present, the method proceeds to step 908. Otherwise, the method proceeds to step 906, where the processing system 110 determines the next capacitive frame.

At step 908, the processing system 110 classifies the grip type of the potential grip. A process for classifying the grip type is described below with respect to FIG. 10. In general, the processing system 110 determines capacitive images for a plurality of time periods from the capacitive responses of the sensor electrode of sensor electrode layer 304, determines grip metrics for each of a plurality of zones in the array of sensor electrodes from the capacitive images, compares the grip metrics across the plurality of zones over the plurality of time periods to determine presence of a grip on the sides of the device, and determines a grip type of the grip. The processing system can employ one or more thresholds when comparing the grip metrics and the type of grip.

At step 910, the processing system 110 sets the exclusion zone based on the grip type. The exclusion zone is exclusive of the plurality of zones used when detecting grip type in step 908. At step 912, the processing system 110 adjusts the threshold(s) used to determine the grip. At step 914, the processing system 110 obtains the next capacitive frame.

At step 916, the processing system 110 determines whether a grip has been detected (e.g., referred to as detection of a side-touch). If not, the processing system 110 obtains the next capacitive frame at step 920. Otherwise, the method proceeds to step 918, and reports the detected grip (e.g,. detected side-touch) to the input device, e.g., input device 100.

From step 920, the method proceeds to step 922, where the processing system 110 determines whether a grip is now absent (e.g., an ungrip event). If not, the method returns to step 916. Otherwise, the method returns to step 906.

Figure 10:
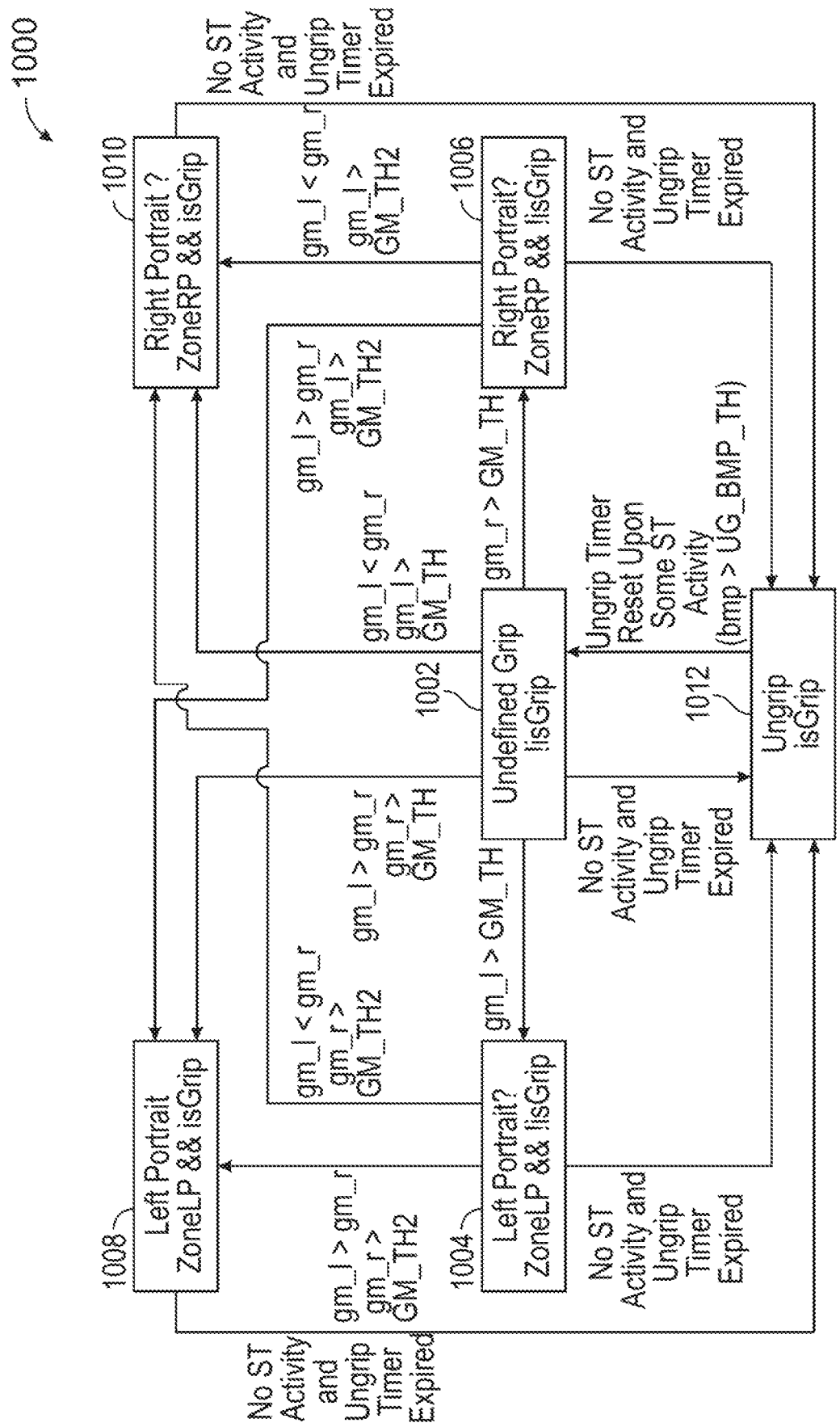
FIG. 10 depicts a state machine diagram depicting an embodiment of grip/un-grip detection performed by a processing system according to an embodiment.

FIG. 10 depicts a state machine 1000 diagram depicting an embodiment of grip/un-grip detection performed by the processing system 110. Transitions of gripping are depicted in blue arrows and transitions in un-gripping are depicted in red arrows. By way of example, two ultimate grip types are defined in FIG. 10, left and right portrait grip specifically, but more types can be defined.

Since different users and behaviors can interact with each sensing edge/zone in different order, the response of interest can occur at different times and moreover does not persist. The state machine of FIG. 10, therefore, accommodates multiple paths, to address variations of order in which the response of interest from each zone may arrive. In addition, the response is converted numerically into a metric (i.e., a "grip metric"), which is preserved before moving onto the next state for later comparison with subsequent grip metrics from other zones.

The criteria to preserve the grip metric varies depending on each state. More specifically, the earlier the states from the initial un-grip state, the more stringently the criteria are set. This is because a response at earlier transient condition contains more noise (i.e. not settled completely in user's hand). As the state machine progresses through further into the states, the criteria to transition to the next state becomes less and less stringent, as a better guess can be made based on metrics from other zones obtained in the previous states. To prevent "chattering" between two states of different grip types, reverting back to previous state is prohibited except upon detecting un-grip. Stated differently, the state machine uses a one-way "tournament" approach among the grip metrics from multiple zones.

Un-grip is detected by referring to the absence of response. Here, conversely, the very source of the problem of detecting grip reliably attributed by constant changes observed in response is a credible barometer to detect un-grip, upon which another tournament is started. The absence of response measured in time (timer to trigger un-grip) can be set differently depending on current metrics obtained from each zone or depending on application. For example, if a set of calculated real-time grip metrics deviates significantly from the current grip type, it is a good indication to expire the timer, or at least shorten it.

Reliable grip/ungrip detection enables the processing system 110 to exclude all responses associated with grip/ungrip and eases detecting and reporting of explicit side-force and/or side-touch. The approach of this invention is also scalable in a sense that more grip types with N-elimination Tournament (N>2) can be accommodated.

In an embodiment, the state machine 1000 tracks the following variables: isGrip indicating absence/presence of a grip; zoneLP indicating absence/presence of left portrait grip; zoneRP indicating absence/presence of a right portrait grip; gm_r indicating a right grip metric; gm_l indicating a left grip metric; GM_TH indicating a first threshold, and GM_TH2 indicating a second threshold. In a state 1002, the grip is undefined (e.g., isGrip is false). Depending on the relationship between gm_l, gm_r, and GM_TH, the state machine 1000 can proceed to any of states 1004, 1006, 1008, 1010, and 1012.

The state 1004 indicates potential presence of a left portrait grip (e.g., zoneLP is true, but isGrip is false). The state machine 1000 proceeds from the state 1002 to the state 1004 if a left grip metric is greater than a first threshold (e.g., gm_l>GM_TH). The state 1006 indicates a potential presence of a right portrait grip (e.g., zoneRP is true, but isGrip is false). The state machine 1000 proceeds from the state 1002 to the state 1006 if a right grip metric is greater than the first threshold (e.g., gm_r>GM_TH).

The state 1008 indicates detection of a left portrait grip (e.g., zoneLP is true and isGrip is true). The state machine 1000 proceeds from the state 1002 to the state 1008 if both the right grip metric is greater than the first threshold and the left grip metric is greater than the right grip metric (e.g., gm_l>gm_r>GM_TH). The state 1010 indicates detection of a right portrait grip (e.g., zoneRP is true and isGrip is true). The state machine 1000 proceeds from the state 1002 to the state 1010 if both the left grip metric is greater than the first threshold and the right grip metric is greater than the leftt grip metric (e.g., gm_r>gm_l>GM_TH). The state 1012 indicates detection of an ungrip of the device. The state machine 1000 can proceed from the state 1002 to the state 1012 if an ungrip timer expires without detection of side-touch activity. Once in the state 1012, the state machine 100 can return back to the state 1002 if the ungrip timer is reset upon detection of some side-touch activity. The state machine 1000 can proceed from any of the states 1004, 1006, 1008, and 1010 to the state 1012 if an ungrip timer expires without detection of side-touch activity.

The state machine 1000 can also proceed from the state 1004 to either the state 1008 or the state 1010. In particular, the state machine 1000 can proceed from the state 1004 to the state 1008 if both the right grip metric is greater than a second threshold and the left grip metric is greater than the right grip metric (e.g., gm_l>gm_r>GM_TH2). The state machine 1000 can proceed from the state 1004 to the state 1010 if both the right grip metric is greater than a second threshold and the right grip metric is greater than the left grip metric (e.g., gm_r>GM_TH2 and gm_r>gm_l).

The state machine 1000 can also proceed from the state 1006 to either the state 1008 or the state 1010. In particular, the state machine 1000 can proceed from the state 1006 to the state 1010 if both the left grip metric is greater than a second threshold and the right grip metric is greater than the left grip metric (e.g., gm_r>gm_l>GM_TH2). The state machine 1000 can proceed from the state 1006 to the state 1008 if both the left grip metric is greater than a second threshold and the left grip metric is greater than the right grip metric (e.g., gm_l>GM_TH2 and gm_l>gm_r).

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A method of detecting a force applied to a side of a display panel of an input device, the method comprising:
   determining a presence of a grip based on detecting first capacitive responses corresponding to a first plurality of sensor electrodes disposed near the side of the display panel in a sensor electrode layer;
   detecting second capacitive responses indicating a change in distance between a second plurality of sensor electrodes disposed near a center of the display panel in the sensor electrode layer and a conductive layer of the input device, wherein the change in distance between the second plurality of sensor electrodes and the conductive layer is in a first direction and the force applied is in a second direction orthogonal to the first direction; and
   determining, in response to the determination of the presence of the grip, a magnitude of the force applied to the side of the display panel based on a number of the second capacitive responses satisfying a first threshold, magnitudes of the second capacitive responses, or a combination thereof.

2. The method of claim 1, further comprising:
   indicating the presence of the grip and a lack of side force in response to determining that the magnitude of the force applied to the side of the display panel fails to satisfy a second threshold.

3. The method of claim 1, further comprising:
   indicating the presence of the grip and a side force on the display panel in response to determining that the magnitude of the force applied to the side of the display panel satisfies a second threshold.

4. The method of claim 3, further comprising:
   indicating the magnitude of the force applied to the side of the display panel along with the indication of the side force.

5. The method of claim 1, wherein detecting the first capacitive responses comprises:
   determining capacitive images;
   determining grip metrics for each of a plurality of zones in the sensor electrodes from the capacitive images;
   comparing the grip metrics across the plurality of zones over a plurality of time periods to determine the presence of the grip on the side of the display panel; and
   determining a grip type of the grip.

6. A processing system for an input device having a capacitive sensor in a display panel of the input device, the capacitive sensor comprising sensor electrodes disposed in a sensor electrode layer, the processing system comprising:
   a sensor module having sensor circuitry configured to operate the sensor electrodes to receive resulting signals; and
   a determination module configured to process the resulting signals to:
      determine a presence of a grip based on detecting first capacitive responses corresponding to a first plurality of the sensor electrodes disposed near a side of the display panel;
      detect second capacitive responses indicating a change in distance between a second plurality of the sensor electrodes disposed near a center of the display panel and a conductive layer of the input device, wherein the change in distance between the second plurality of sensor electrodes and the conductive layer is in a first direction and a force applied to the side of the display panel is in a second direction orthogonal to the first direction; and
      determine, in response to the determination of the presence of the grip, a magnitude of the force applied to the side of the display panel based on a number of the second capacitive responses satisfying a first threshold, magnitudes of the second capacitive responses, or a combination thereof.

7. The processing system of claim 6, wherein the determination module is configured to:
   indicate the presence of the grip and a lack of side force in response to determining that the magnitude of the force applied to the side of the display panel fails to satisfy a second threshold.

8. The processing system of claim 6, wherein the determination module is configured to:
   indicate the presence of the grip and a side force on the display panel in response to determining that the magnitude of the force applied to the side of the display panel satisfies a second threshold.

9. The processing system of claim 8, wherein the determination module is configured to:
   indicate the magnitude of the force applied to the side of the display panel along with the indication of the side force.

10. The processing system of claim 6, wherein the determination module is configured to detect the first capacitive responses by:
    determining capacitive images;
    determining grip metrics for each of a plurality of zones in the sensor electrodes from the capacitive images;
    comparing the grip metrics across the plurality of zones over a plurality of time periods to determine the presence of the grip on the side of the display panel; and
    determining a grip type of the grip.

11. A method of detecting presence of a grip on sides of a display panel of an input device, the method comprising:
    operating sensor electrodes of the display panel to receive resulting signals for a plurality of time periods;
    determining capacitive images from the resulting signals received during the plurality of time periods;
    determining grip metrics for each of a plurality of zones in the sensor electrodes from the capacitive images;
    comparing the grip metrics across the plurality of zones over the plurality of time periods to each other and to a threshold to determine the presence of the grip on the sides of the display panel; and
    determining, from a plurality of grip types, a grip type of the grip based on the comparison of the grip metrics to each other and to the threshold, wherein the drip type is determined to be a first grip type of the plurality of grip types in response to a first grip metric of the grip metrics being greater than a second grip metric of the grip metrics and the second grip metric being greater than the threshold, and the grip type is determined to be a second grip type of the plurality of grip types in response to the second drip metric being greater than the first grip metric and the first grip metric being greater than the threshold.

12. The method of claim 11, further comprising:
    setting an exclusion zone in the sensor electrodes based on the grip type, the exclusion zone exclusive of the plurality of zones.

13. The method of claim 12, further comprising:
    adjusting one or more thresholds used to determine the grip type.

14. The method of claim 11, further comprising:
    detecting absence of the grip on the sides of the input device; and
    indicating an ungrip event in response to detecting the absence of the grip.

15. The method of claim 14, wherein the ungrip event is further indicated based on expiration of an ungrip timer while detecting the absence of the grip on the sides of the display panel.

16. A processing system for an input, the processing system comprising:
    a sensor module having sensor circuitry configured to operate sensor electrodes in a display panel of an input device to receive resulting signals during a plurality of time periods; and
    a determination module configured to process the resulting signals to:
       determine capacitive images from the resulting signals for the plurality of time periods;
       determine grip metrics for each of a plurality of zones in the sensor electrodes from the capacitive images;
       compare the grip metrics across the plurality of zones over the plurality of time periods to each other and to a threshold to determine presence of a grip on sides of the display panel; and
       determine, from a plurality of grip types, a grip type of the grip based on the comparison of the grip metrics to each other and to the threshold, wherein the grip type is determined to be a first grip type of the plurality of grip types in response to a first grip metric of the grip metrics being greater than a second grip metric of the grip metrics and the second grip metric being greater than the threshold, and the grip type is determined to be a second grip type of the plurality of grip types in response to the second grip metric being greater than the first grip metric and the first grip metric being greater than the threshold.

17. The processing system of claim 16, wherein the determination module is configured to:
   set an exclusion zone in the sensor electrodes based on the grip type, the exclusion zone exclusive of the plurality of zones.

18. The processing system of claim 17, wherein the determination module is configured to:
   adjust one or more thresholds used to determine the grip type.

19. The processing system of claim 16, wherein the determination module is configured to:
   detect absence of the grip on the sides of the display panel; and
   indicate an ungrip event in response to detecting the absence of the grip.

20. The processing system of claim 19, wherein the ungrip event is further indicated based on expiration of an ungrip timer while detecting the absence of the grip on the sides of the display panel.

* * * * *